UNITED STATES PATENT OFFICE 2,027,338

MANUFACTURE OF VARNISH BASES

Adolf Heck, Kansas City, Mo., assignor to Cook Paint & Varnish Company, Kansas City, Mo., a corporation of Delaware No Drawing. Application June 25, 1935. Serial No. 28,353

14 Claims. (Cl. 260—8)

This invention relates to the manufacture of varnish bases; and it comprises methods of making a varnish base useful in making coating compositions wherein a phenol is condensed with a polybasic acid and partially resinified, the product is esterified with a polyhydric alcohol and with the acids of drying oils, the material at this stage being sometimes blended or combined with a drying oil; and it further comprises varnish bases so obtained and the varnishes obtained by dissolving the base in a volatile vehicle such as coal tar oils, mineral spirits, turpentine, etc.; all as more fully hereinafter set forth and as claimed.

In my prior applications Serial Nos. 526,568 and 586,467, filed March 30, 1931 and January 13, 1932 respectively, I have described processes of making new resins from partially resinified complex phenol-phthalic anhydrid condensation products, and various compositions containing the new modified resins. In those processes the phenol is condensed with phthalic anhydrid and the product partially resinified. The partially resinified condensation product is then reacted with certain reagents to form more complex resins.

This application is in part a division and in part a continuation of the said prior applications. It is directed to methods of making particular varnish bases, to the bases and to varnishes made therefrom.

In the present invention partially resinified complex phenol-phthalic anhydrid condensation products prepared as described in the prior applications are esterified with glycerin and with fatty acids of a drying oil, to form new types of varnish bases characteristically different from those now in use in making oil varnishes.

The new varnish bases have, in part, the characteristics of resinous glycerids capable of heat-hardening and in part the characteristics of oily glycerids of drying oils, but are unitary bodies of complex nature. No fractionation or segregation can be obtained with solvents. Their solubility in a wide range of solvents and other features of their behavior indicates the presence of a new resin molecule of great complexity. The varnish bases of the prior art are rarely soluble in many solvents of different chemical types.

With the materials of this invention certain difficulties in preparing oil type varnishes with prior varnish bases are avoided or eliminated. Better varnishes are easily made; varnishes either "long" or "short" in oil.

In the present invention the stated materials are processed by a correlated series of steps. A phenol is condensed with the phthalic anhydrid in the presence of a catalyst, ordinarily aluminum chlorid; 2 mols of phenol being usually condensed with about 1 mol of phthalic anhydrid. Advantageously the phenol is melted and the phthalic anhydrid added to the liquid. When a homogeneous solution is obtained, the catalyst is slowly added. With aluminum chlorid the temperature rises to about 130° C. because of vigorous reaction. After the reaction is complete, the reaction product is kept at about 120° C. until it thickens and a partially resinified mass is obtained. Reaction with glycerin and drying oil acids follows.

In an advantageous procedure glycerin is added to a molten mixture of the acids with the partially resinified material. Heating is continued, at between 200° and 250° C., until esterification is effected and a new resin of the desired properties is obtained; till a sample cooled to room temperature shows the required consistency, hardness, etc.

All the varnish bases obtained in the described method are of the same general properties but variations in proportions of ingredients give some variation in the product. All are soluble in benzol, toluol, esters, ketones and turpentine, giving clear uniform solutions directly applicable as varnishes. Most of the varnish bases are also soluble in mineral spirits such as the commercial turpentine substitutes. They can be blended with drying oils, such as linseed oil and perilla oil. In blending, it is advantageous to add the drying oil immediately after the introduction of the glycerine. In so doing homogeneous compositions are obtained from which drying oil cannot be separated by the fractionating action of solvents.

In qualifying the varnish base with drying oil it is advantageous to mix the partially resinified material made from phenol and phthalic anhydrid with the fatty acid and bring the mixture to about 200° C. At this time the glycerin is slowly added while continuing the heating. When a clear mixture results, preheated drying oil is added. It is advantageous to have the clear mixture at about 250° C. at the time of the addition. Heating at 250° C. is continued until a portion of the hot liquid cooled to the ordinary temperature and cut with an equal weight of mineral spirits gives a varnish having a viscosity between 3 and 4 minutes by test in a No. 4 Ford cup at 25° C.

In making the varnish bases to secure a neutral product it is sometimes advantageous to use somewhat more glycerin than the calculated amounts.

With 100 parts of phenol phthalic condensation product, and between 50 and 100 parts of fatty acid and 40 to 50 parts of glycerin, resinous varnish bases having satisfactory acid number can be obtained without difficulty. Usually the acid number should be between 10 and 15.

With higher ratios of fatty acid, the resins are more oil-like in character. By adjusting the ratios more or less plastic resins may be obtained at will. A variety of products may be obtained, each useful for special purposes.

The ratio and the type of drying oil may vary. To obtain "long oil" varnishes, the amount of drying oil is increased. The sum of the fatty acid and of the drying oil determine the type of varnish base obtained; and are correlated to produce what may be wanted.

Good commercial varnish bases are produced with component ratios within the following range:

| | Parts |
|---|---|
| Phenol-phthalic anhydrid condensation product | 100 |
| Glycerin | 40 to 55 |
| Fatty acid | 40 to 100 |
| Drying oil | 20 to 150 |

The plasticity of the resin depends partly upon the extent of the resinification obtained during the heating at 200° C. or above. Reactive residual hydroxyl groups in the phenol phthalic condensation product play a part in this resinification operation. The consistency of the resin or varnish base is therefore not solely a matter of adjusting the ratio of the esterifying reagents.

The present invention is quite flexible in meeting demands for varnish bases having special combinations of properties.

In making the phenol phthalic anhydrid condensation product, in lieu of phenol itself and of phthalic anhydrid, other phenols and other dibasic aromatic carboxylic acids may be used. The phthalic anhydrid may be replaced with phthalic acid or by another suitable polybasic carboxylic acid of cyclic structure. The carbolic acid (phenol) may be replaced by similar phenolic bodies such as cresols or xylenols. Also, in lieu of aluminum chlorid, as the catalyst, other condensing catalysts may be used, such as the tin chlorids, ferric chlorid, etc. As stated in my copending application Ser. No. 526,568, zinc chlorid may be used as the catalyst. In other words, in my present processes, the condensation catalyst used in making the phenol-polybasic acid condensation product may be a catalyst of the class consisting of the chlorid of aluminum, iron, tin and zinc.

The partially resinified phenol phthalic anhydrid condensation products are materials of rather indefinite constitution. They probably contain, among other things, para-dioxytriphenyl-carbinol-o-carboxylic acid or a lactone of that compound or, and probably, both the acid and lactone. This, unlike phthalic acid is mono-basic. The exact nature of the complex reaction products is not here material, it being sufficient that they are convertible by the present methods into new and valuable varnish bases.

Other high boiling polyhydric bodies may be substituted for the glycerine, in whole or in part, but glycerin is satisfactory for most purposes. The glycols may be used but are not better.

Various fatty acids, both drying and non-drying, may be used, such as those of castor oil, linseed oil, perilla oil or soya bean oil. Acids of drying oils are ordinarily used. Sometimes rosin, resin acids and resinous materials which are somewhat acid may be employed in conjunction with and in addition to the fatty acid. Resin acids from soft manila copal are advantageous.

The following examples in which the parts are parts by weight are illustrative embodiments of this invention.

*Example 1*

Approximately two molecules of ordinary phenol are reacted with 1 molecule of phthalic anhydrid in the presence of freshing sublimed aluminum chlorid as a catalyst; 190 parts of phenol being heated to a temperature of 80 to 90° C. and 148 parts of phthalic anhydrid added. When a homogeneous solution is obtained, 10 to 50 parts of aluminum chlorid are slowly added. A violent reaction occurs and the temperature rises to about 120–130° C. After completion of the violent reaction, the mixture is held at 120° C. until a gelatinous mass is obtained. Approximately two hours are required.

*Example 2*

To 100 parts of the condensation product of Example 1 there is added 90 parts of linseed oil acids and the mixture slowly heated to 200° C. in about 45 minutes. To this hot mixture, 48 parts of glycerine are slowly added, while continuing the heating. After all the glycerin is added the temperature is gradually brought to 250° C. Approximately one hour is required. The mixture is held at about 250° C. until a clear product results having a viscosity about that of heavy bodied stand oil. Some esterification is effected during this time. To the clear product at 250° C., 100 parts of preheated linseed oil (200° C.) is gradually added, the mixture being heated and stirred during this addition. After all the linseed oil has been added the mixture is further heated at about 250° C. until a sample cooled to room temperature is absolutely clear and shows the desired properties such as specific gravity, viscosity, color, acid value, etc. Between 6 and 10 hours is usually required.

*Example 3*

In making a varnish, the varnish base, after complete or partial cooling, is cut with an equal weight of mineral spirits (boiling point 300–370° F.). The 50 per cent solution thus obtained is an excellent varnish and has a viscosity of one minute, 20 seconds when tested in a No. 4 Ford cup at 25° C. The varnish is long in oil. It gives coatings which dry tack-free in about 10 to 12 hours. The air-dried coating may be baked at 120° C. for three hours.

This varnish may be pigmented in the usual way with the usual pigments to give good enamels.

*Example 4*

In making a varnish base particularly adaptable in producing baked oil varnishes, 100 parts of the product formed by the process of Example 1 are esterified with 90 parts of the fatty acids of castor oil, linseed oil, perilla oil or soya oil and with 50 parts of glycerin. The reaction product and the fatty acid are first mixed together and the mixture heated slowly to about 200° C. and kept at this temperature until the mixture is almost clear. Then the glycerin is slowly added while continuing the heat. A clear product is obtained having a viscosity about the same as that of heavy bodied stand oil ("polymerized" linseed oil). Upon further heating this is converted into a plastic resinous mass.

*Example 5*

In a modification of this procedure 100 parts of linseed oil or other drying oil are heated to 240° C. and then 100 parts of the viscous resin of Example 4 are added. The heating is continued for about 2 hours or until the desired consistency and uniform mixture are obtained. The mixture is cooled to about 150° C. and 200 parts of oil of turpentine or other thinner are added. A drier such as cobalt acetate may be added during the cooking. By adding a pigment, an enamel is obtained.

*Example 6*

To prepare a varnish base short in oil, the procedure of Example 2 may be used, except that the respective amounts of linseed oil acids and of linseed oil are reduced.

A mixture of 100 parts of the product of Example 1 and 60 parts of linseed oil acids are gradually heated to 200° C. and stirred until a uniform mix is obtained. About 45 minutes are required. Then 40 parts of glycerin are gradually stirred into the hot mixture. When all the glycerin has been added the mixture is heated to about 250° C. and is held at that temperature until a clear product having a viscosity about that of a heavy bodied stand oil is obtained. About 4 hours are required. During this time most of the esterification is effected, but the complete esterification and the resinification desired are postponed until after the addition of the drying oil.

To the hot partially esterified material are added 15 parts of preheated linseed oil. This mixture is held at about 250° C. until the desired reactions and resinification are obtained. About one hour is required to obtain a clear, uniform resin upon cooling to room temperature. When a sample so cooled shows the desired end point has been reached, the heating is stopped.

The resinous varnish base is then partially cooled to about 150° C. and cut with toluol or other suitable varnish solvents.

This resin, short in oil, when cooled to room temperature is a non-tacky material. It is soluble in coal tar hydrocarbons.

The new varnish bases have many advantages over the resins prepared in ordinary ways from phthalic acid, glycerin and fatty acids, with or without drying oils. They are easier to prepare, the solubilities are better, the products are uniform, giving clear, homogeneous solutions without part "kicking" out and the varnish films made in using the varnish are of better quality. These new results and the betterment I attribute as being, in large measure, due to the fact that the phthalic acid is converted into something else; the new products do not have the same constitution or properties as those in which phthalic acid or anhydrid is used as such.

Resinous bodies made by reaction of phthalic anhydrid, glycerin and a fatty acid of some kind are well known and commercially used. They harden in the usual A, B, C succession. All these resins, however, on treatment with caustic soda are hydrolyzed, giving sodium phthalate and a sodium soap of the fatty acid. In the resinous product of the present invention this is not true; saponification does not give a phthalate. The identity of the phthalic acid group disappears in the process hereinbefore described.

What I claim is:
1. In the manufacture of varnishes, the improvement in making a varnish base which comprises condensing about 2 mols of a phenol with 1 mol of an anhydrid of an aromatic dicarboxylic acid in the presence of an inorganic catalyst of the class consisting of the chlorides of aluminum, iron, tin and zinc, to form a phenol-polybasic acid condensation product, fusing together the said condensation product and the fatty acid of a fatty oil, adding sufficient glycerine to the molten mixture to produce esterification, and heating to at least 200° C. until esterification and resinification occur, a resinified material being obtained upon cooling.

2. The process of claim 1 wherein a drying oil is added to the said reaction mixture before the resinified material is obtained by said heating to at least 200° C.

3. In the manufacture of varnish bases, the step which comprises esterifying a phenol-phthalic condensation product with glycerine and with a fatty acid of a fatty oil, said phenol-phthalic condensation product being one obtained by condensing about 2 mols of a phenol with 1 mol of phthalic anhydrid in the presence of an inorganic catalyst of the class consisting of the chlorides of aluminum, iron, tin and zinc.

4. In the manufacture of varnish resins the steps which comprise adding an aromatic dicarboxylic acid anhydrid to a molten phenol in a molecular ratio of approximately 1:2 of anhydrid to phenol, adding aluminum chloride to the homogeneous solution thus obtained, permitting the first violent reaction to subside and then heating the reaction mixture until the reaction is substantially complete and a gelatinous mass is obtained, to produce a phenol-polybasic acid condensation product, fusing together with said condensation product a fatty acid of a drying oil, adding sufficient polyhydric alcohol to the molten mixture to produce esterification, and further heating the reaction mixture to between 200° and 250° C. until esterification and resinification occur, and a resinified material having an acid number between 10 and 15 is obtained, said resinified material being an improved varnish base and soluble in mineral spirits and other varnish solvents.

5. The process of claim 4 in which said aromatic dicarboxylic acid anhydrid is phthalic anhydrid.

6. The process of claim 4 wherein said polyhydric alcohol is glycerine.

7. The process of claim 4 wherein said fatty acid is the fatty acid of linseed oil.

8. As an improvement in the manufacture of useful complex resins from phenols, phthalic anhydrid, glycerine and the fatty acids of a drying oil, the steps which comprise heating approximately 190 parts of phenol between 80 and 90° C., adding about 148 parts of phthalic anhydrid to the heated phenol, continuing the heating until a homogeneous solution is obtained, slowly adding between 10 to 50 parts of aluminum chloride to the said solution, permitting the first violent reaction to subside and then further heating the reaction mixture to about 120° C. until the reaction is substantially complete and recovering the condensation product thus obtained, fusing together about 100 parts of said condensation product and between 40 to 100 parts of said fatty acids, adding to the molten mass so obtained between 40 and 55 parts of glycerine and further heating the mixture to about 250° C. until a clear non-tacky esterified resin is obtained upon cooling.

9. The process of claim 8 wherein said fatty acids are the fatty acids of linseed oil.

10. The process of claim 8 wherein preheated drying oil, preheated to about 240° C., is added to the said clear molten resin prior to the stated further heating, between 20 and 150 parts of drying oil being so added and the mixture of oil and resinous ester being then heated to about 250° C. until a uniform, homogeneous varnish base is obtained, said varnish base being soluble in a wide range of varnish solvents.

11. In the manufacture of varnish bases, the improved process which comprises condensing a phenol with an aromatic polybasic carboxylic acid with the aid of aluminum chlorid to produce a phenol-polybasic acid condensation product containing reactive phenolic groups and containing phenol combined with the polybasic acid in approximately the molar ratio of 2:1, partially resinifying the said condensation product, by heating to approximately 120° C., fusing the said partially resinified condensation product with a fatty acid of a fatty oil, adding glycerine to the molten mixture in amount sufficient to esterify the same, further heating the mixture to effect some esterification, adding a drying oil and heating the reaction mixture to at least 200° C. until a unitary composite varnish base is obtained.

12. The process of claim 11 wherein the hot varnish base is partially cooled and then reduced with a varnish solvent.

13. As an improved varnish base, the clear non-tacky resinous material obtained by the process of claim 11, said resinous material being a substantially neutral ester comprising a drying oil combined with a phenol-polybasic acid condensation product esterified with a fatty acid and with glycerine, said varnish base being soluble in mineral spirits and other varnish solvents and yielding when dissolved in said solvents to produce a 50 per cent solution thereof, a varnish having a viscosity between 1 and 5 minutes in a No. 4 Ford cup.

14. As a new product, useful in making varnish and other coating compositions, the resinified product obtained by the process of claim 12, said product being a resinified reaction product of a phenol-polybasic acid condensation product with a polyhydric alcohol and a fatty acid of fatty oil, said resinified product being a unitary material uniformly soluble in drying oils and in varnish solvents such as mineral spirits, coal tar hydrocarbons and the like.

ADOLF HECK.